Dec. 18, 1923.
C. A. FRANKLIN
1,478,331
FACE TURNING MACHINE
Filed Feb. 13, 1922  2 Sheets-Sheet 1
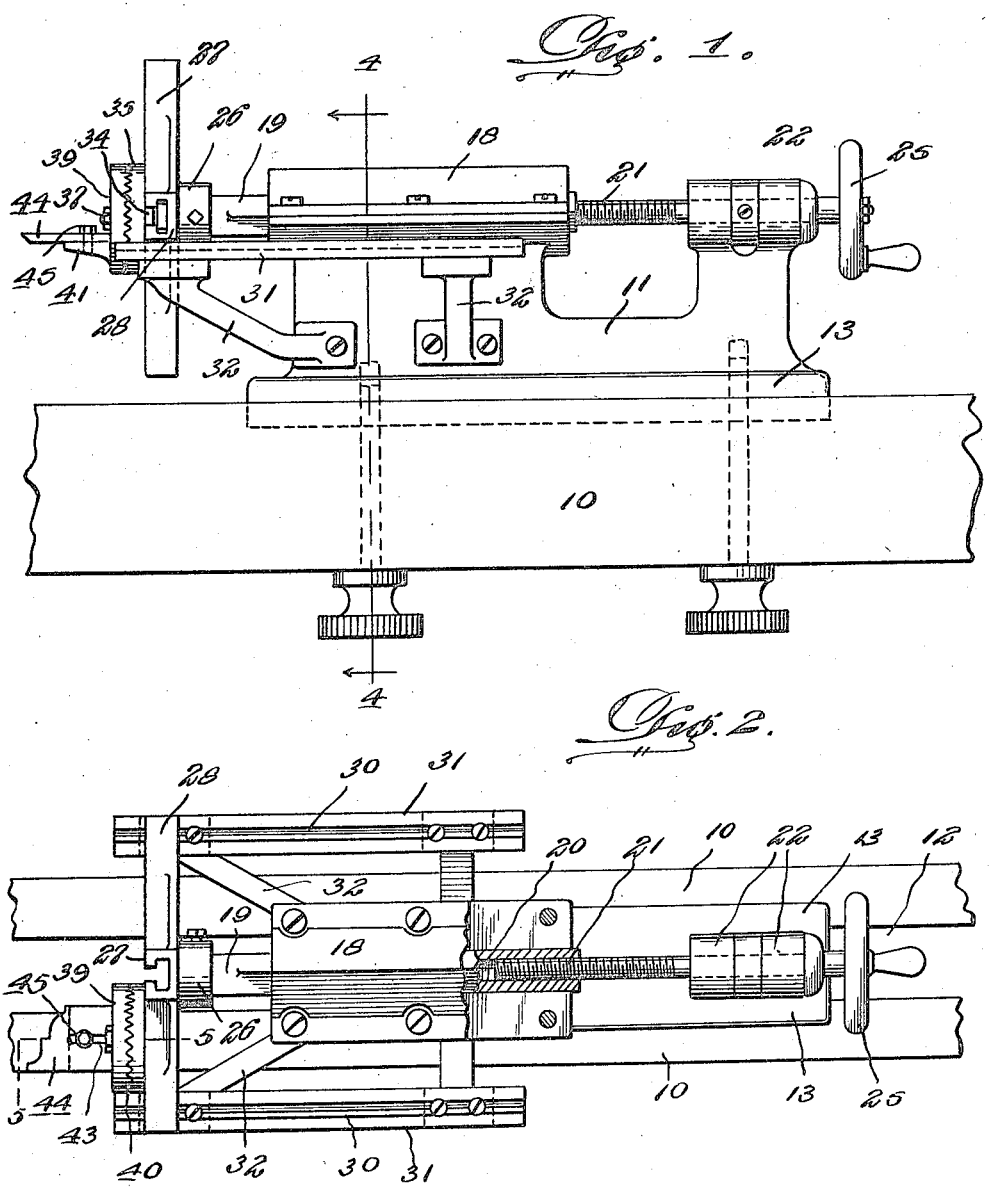
C. A. Franklin,
INVENTOR
BY Victor J. Evans
ATTORNEY
WITNESSES:

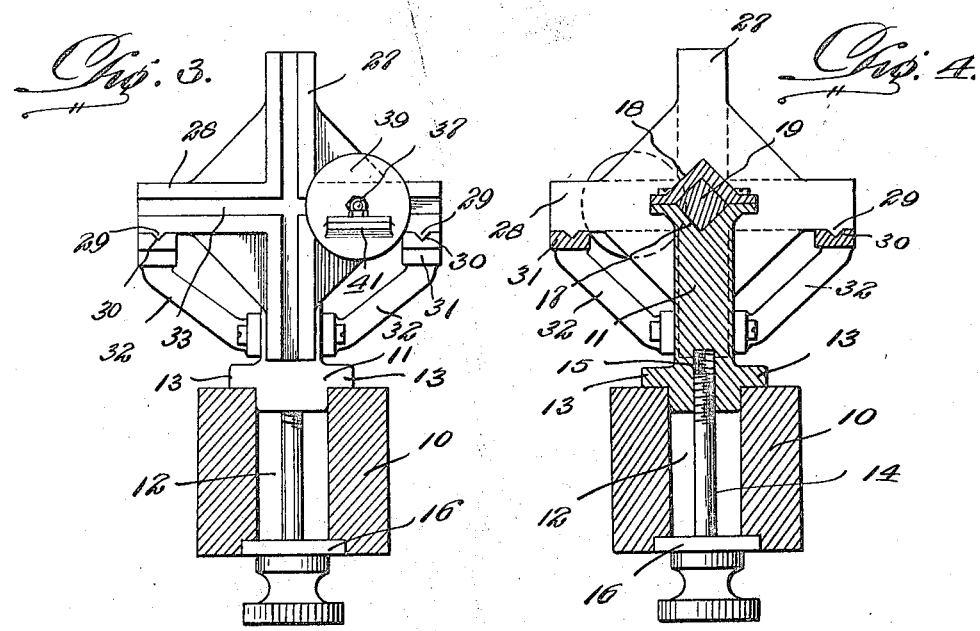
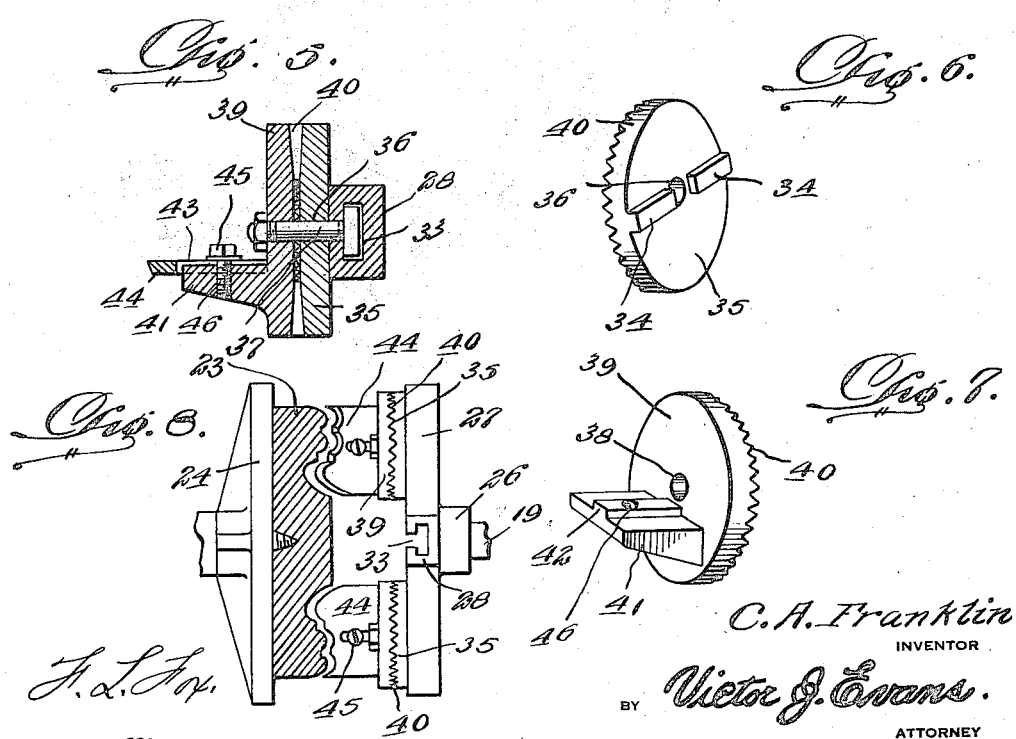

Patented Dec. 18, 1923.

1,478,331

UNITED STATES PATENT OFFICE.

CHARLES ALONZO FRANKLIN, OF PHILADELPHIA, PENNSYLVANIA.

FACE-TURNING MACHINE.

Application filed February 13, 1922. Serial No. 536,268.

*To all whom it may concern:*

Be it known that I, CHARLES A. FRANKLIN, a citizen of the United States, residing at Philadelphia, in the State of Pennsylvania, have invented new and useful Improvements in Face-Turning Machines, of which the following is a specification.

This invention comprehends the provision of a tail stock for wood turning lathes, and provides a construction whereby the cutting blades or tools can be properly and conveniently moved in a direction of the work, so that the face of a pedestal base or the like can be properly worked on.

Another object of the invention resides in the construction of a tail stock for wood turning lathes, including means whereby the angle of the cutting blades or tools can vary with relation to each other, and said tools or blades being quickly interchanged for different kinds of work.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1 is a side elevation.

Figure 2 is a top plan view, partly in section.

Figure 3 is an end elevation.

Figure 4 is a sectional view taken on line 4—4 of Figure 1.

Figure 5 is a sectional view taken on line 5—5 of Figure 2.

Figure 6 is a detail view of the stationary member of the tool support.

Figure 7 is a similar view of the movable member of said support.

Figure 8 is a view, showing the position of the tools or cutting blades with relation to the work.

Referring to the drawings in detail, 10 represents the base of the lathe upon which is mounted the body portion 11 of the tail stock. The base 10 is slotted as at 12 and receives a portion of the body 11 of the tail stock, said body portion being formed with flanges 13 which repose upon the base 10 of the lathe in a manner clearly illustrated in Figures 3 and 4. The body portion or stock 11 is susceptible of adjustment longitudinally of the base 10 of the lathe, so that it can be properly positioned thereon, and is subsequently held fixed relatively to the lathe by means of fastening bolts 14 which are threaded into bores 15 of the stock 11, and which bolts are passed through the slot 12 and equipped with suitable heads 16 which are counter-sunk in the underside of the base as shown. The upper edge of the stock 11 is provided with a substantially V-shaped channel 17 which is covered by an inverted substantially V-shaped cover or plate 18 defining therewith a chamber in which is arranged the shank 19 of the tool support, it being noted that the shank 19 is of the same cross sectional configuration as the chamber in which it is arranged. This shank however, is formed with an interiorly threaded bore 20 to accommodate the threaded adjusting element 21, the latter having a smooth portion rotatably fitted in a bearing 22, so that incident to the rotation of the threaded element in one or the other direction, the shank 19 is moved longitudinally of its chamber and consequently, carries the tools to be hereinafter described toward or away from the work indicated at 23, and which is supported by the head stock 24 of the lathe. The element 21 is equipped with a wheel 25 by means of which the element is rotated to effect an adjustment of the shank 19. Supported on one end of the shank 19 is a collar 26 and carried by this collar is a member having a configuration similar to a cross, the arms of which are indicated at 27 and 28 respectively. The arms 28 are arranged in a horizontal plane and the undersides of which are formed with ribs 29 which are received and slide in grooves 30 of the track members 31, the latter being supported by braces 32 secured to the opposed sides of the stock 11. This construction obviously serves to guide the shank and the tools toward and away from the head stock 24. The arms 27 and 28 above referred to are grooved or channeled as at 33 to receive the blocks 34 arranged upon one side of the disk 35, to hold the latter against rotation with respect to the particular arm with which it is associated. The disk 35 is provided with a central opening 36 to accommodate a suitable fastening element 37 which is passed through this opening and also through the opening 38 of the disk 39 which is arranged in confronting relation to the disk 35. The adjacent faces of these respective disks are provided with teeth 40 to hold the disks fixed relatively, after the disk 39 has been rotated with respect to the disk 35 with a view of properly positioning the cutting blade or tool carried thereby. It will be noted that the disk 39 supports a shelf or the like 41 upon the upper surface of which is formed a raised portion 42 received by the slot 43 of the tool or cutting blade 44. A suitable fastening element 45 is passed through the slot of said cutting element and also through an opening 46 in the ledge or shelf 41. From the construction herein shown and described, it will be manifest that the cutting blades or tools can be arranged at any desired angle, and that different kinds of blades or tools can be used depending of course upon the character of work to be done. As shown in Figure 8, the construction is primarily designed for performing work on the face of pedestal bases or the like which is indicated at 23 in Figure 8 and which base is secured to the head stock 24 in any suitable manner. The stock body is not only susceptible of adjustment on the base of the lathe, but that the shank 19 can also be easily and conveniently moved toward and away from the work as the occasion requires.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:

In combination, a shank, a tool head supported at one end of the shank and including a plurality of arms radiating from said shank, a two part disk associated with each arm, cooperating means carried by each arm and one part of said disk to hold said parts stationary, the other part of said disk being susceptible of rotation, cooperating means carried by the respective parts of each disk for holding said parts fixed relatively, and means carried by the rotatable part of said disk for supporting a tool thereon.

In testimony whereof I affix my signature.

CHARLES ALONZO FRANKLIN.